(12) United States Patent
Keating et al.

(10) Patent No.: US 12,047,602 B2
(45) Date of Patent: Jul. 23, 2024

(54) IMAGE DATA ENCODING AND DECODING

(71) Applicant: Sony Group Corporation, Tokyo (JP)

(72) Inventors: Stephen Mark Keating, Basingstoke (GB); Karl James Sharman, Basingstoke (GB); Adrian Browne, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 283 days.

(21) Appl. No.: 17/619,953

(22) PCT Filed: Jun. 24, 2020

(86) PCT No.: PCT/GB2020/051527
§ 371 (c)(1),
(2) Date: Dec. 16, 2021

(87) PCT Pub. No.: WO2021/001644
PCT Pub. Date: Jan. 7, 2021

(65) Prior Publication Data
US 2022/0303575 A1    Sep. 22, 2022

(30) Foreign Application Priority Data
Jun. 25, 2019   (GB) .................................... 1909140

(51) Int. Cl.
*H04N 19/159*  (2014.01)
*H04N 19/10*   (2014.01)
(Continued)

(52) U.S. Cl.
CPC ......... *H04N 19/593* (2014.11); *H04N 19/167* (2014.11); *H04N 19/80* (2014.11)

(58) Field of Classification Search
None
See application file for complete search history.

(56) References Cited

U.S. PATENT DOCUMENTS

| 2007/0053433 A1* | 3/2007 | Song | H04N 19/147 |
| | | | 375/E7.266 |
| 2020/0120358 A1* | 4/2020 | Poirier | H04N 19/593 |
| 2020/0228831 A1* | 7/2020 | Heo | H04N 19/593 |
| 2022/0038679 A1* | 2/2022 | Xiu | H04N 19/176 |

FOREIGN PATENT DOCUMENTS

| EP | 1 761 063 A2 | 3/2007 |
| WO | WO-2018063886 A1 | 4/2018 |

(Continued)

OTHER PUBLICATIONS

International Search Report issued on Oct. 1, 2020 in PCT/GB2020/051527 filed on Jun. 24, 2020.

(Continued)

*Primary Examiner* — Talha M Nawaz
(74) *Attorney, Agent, or Firm* — Oblon, McClelland, Maier & Neustadt, L.L.P.

(57) ABSTRACT

An image encoding apparatus comprises a selector configured to select, from a set of candidate prediction operations each defining at least a prediction direction, a prediction operation for prediction of samples of a current region of a current image, the current region comprising an array of two or more rows and two or more columns of samples; and an intra-image predictor configured to interpolate predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, in which the intra-image predictor is configured to apply an interpolation process to the group of reference samples in order to generate each predicted sample; in which the intra-image predictor is configured to apply a different respective inter- (Continued)

polation process for a plurality of subsets of the predicted samples, according to a relationship between a plurality of interpolation processes and a corresponding plurality of subsets of sample positions in the array of samples.

18 Claims, 14 Drawing Sheets

(51) Int. Cl.
    *H04N 19/167*    (2014.01)
    *H04N 19/593*    (2014.01)
    *H04N 19/80*     (2014.01)

(56) References Cited

FOREIGN PATENT DOCUMENTS

WO    WO-2018221817 A1   12/2018
WO    WO 2019/002171 A1   1/2019

OTHER PUBLICATIONS

Akula, S.N. et al., Joint Video Exploration Team (JVET)of ITU-T SG 16 WP 3 and ISO/IEC JTC 1/SC 29/WG 1110th Meeting: San Diego, US, Apr. 10-20, 2018 Description of SDR, HDR and 360° video coding technology proposal considering mobile application scenario by Samsung, Huawei, GoPro, and HiSilicon JVET-J0024 version 5 Apr. 14, 2018.

Benjamin Bross, et al. High efficiency video coding (HEVC) text specification draft 6. JCTVC-H1003. Feb. 10, 2012.

\* cited by examiner

IMAGE DATA ENCODING AND DECODING

BACKGROUND

Field

This disclosure relates to image data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several video data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

High Efficiency Video Coding (HEVC), also known as H.265 or MPEG-H Part 2, is a proposed successor to H.264/MPEG-4 AVC. It is intended for HEVC to improve video quality and double the data compression ratio compared to H.264, and for it to be scalable from 128×96 to 7680×4320 pixels resolution, roughly equivalent to bit rates ranging from 128 kbit/s to 800 Mbit/s.

SUMMARY

The present disclosure addresses or mitigates problems arising from this processing.

The present disclosure provides an image encoding apparatus comprising:

a selector configured to select, from a set of candidate prediction operations each defining at least a prediction direction, a prediction operation for prediction of samples of a current region of a current image, the current region comprising an array of two or more rows and two or more columns of samples; and an intra-image predictor configured to interpolate predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, in which the intra-image predictor is configured to apply an interpolation process to the group of reference samples in order to generate each predicted sample;

in which the intra-image predictor is configured to apply a different respective interpolation process for a plurality of subsets of the predicted samples, according to a relationship between a plurality of interpolation processes and a corresponding plurality of subsets of sample positions in the array of samples.

The present disclosure also provides an image decoding apparatus comprising:

a prediction operation selector configured to receive prediction operation data in an encoded data stream defining a prediction operation for a current region of a current image with respect to a group of reference samples, the current region comprising an array of two or more rows and two or more columns of samples; and an intra-image predictor configured to interpolate predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, in which the intra-image predictor is configured to apply an interpolation process to the group of reference samples in order to generate each predicted sample;

in which the intra-image predictor is configured to apply a different respective interpolation process for a plurality of subsets of the predicted samples, according to a relationship between a plurality of interpolation processes and a corresponding plurality of subsets of sample positions in the array of samples.

The present disclosure also provides an image encoding method comprising:

selecting, from a set of candidate prediction operations each defining at least a prediction direction, a prediction operation for prediction of samples of a current region of a current image, the current region comprising an array of two or more rows and two or more columns of samples; and interpolating predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, by applying an interpolation process to the group of reference samples in order to generate each predicted sample;

in which interpolating step comprises applying a different respective interpolation process for a plurality of subsets of the predicted samples, according to a relationship between a plurality of interpolation processes and a corresponding plurality of subsets of sample positions in the array of samples.

The present disclosure also provides an image decoding method comprising:

receiving prediction operation data in an encoded data stream defining a prediction operation for a current region of a current image with respect to a group of reference samples, the current region comprising an array of two or more rows and two or more columns of samples; and interpolating predicted samples of the current region with respect to one or more of a group of reference samples being samples decoded from previously encoded samples of the current image, the group of reference samples being selected in dependence upon a prediction operation, between a current sample to be predicted and a reference position amongst the reference samples, by applying an interpolation process to the group of reference samples in order to generate each predicted sample;

in which interpolating step comprises applying a different respective interpolation process for a plurality of subsets of the predicted samples, according to a relationship between a plurality of interpolation processes and a corresponding plurality of subsets of sample positions in the array of samples.

Further respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 21 to 24a schematically illustrate respective apparatus;

DESCRIPTION OF THE PREFERRED EMBODIMENTS

Figure 1:
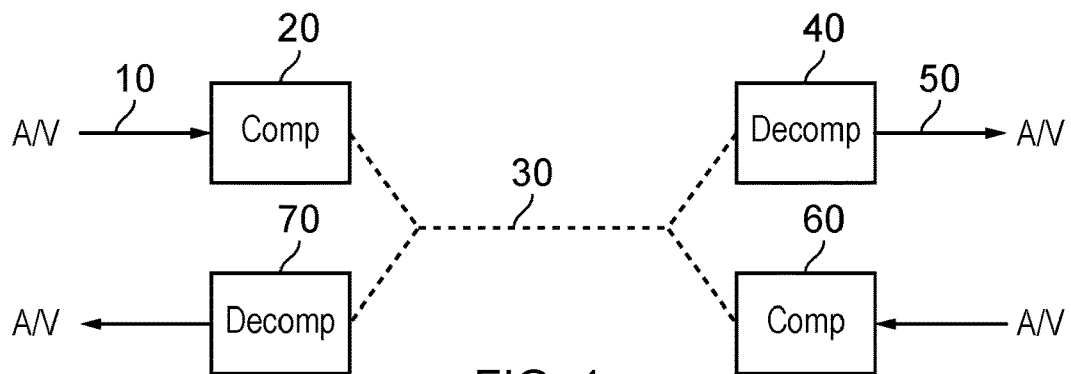
FIG. 1 schematically illustrates an audio/video (AN) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is uni-directional, only one of the nodes would require a compression apparatus and the other node would only require a decompression apparatus.

Figure 2:
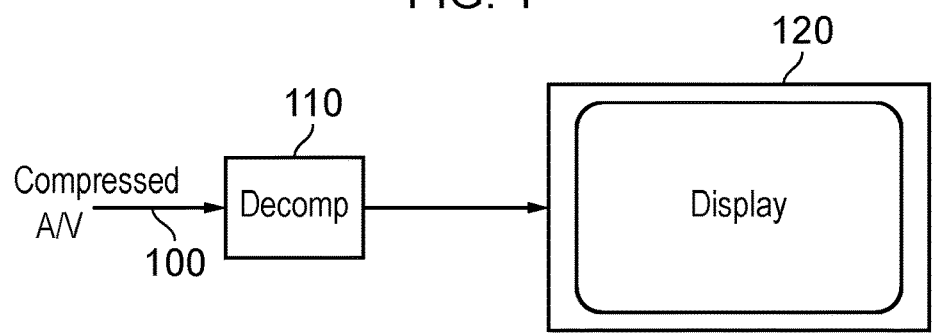
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
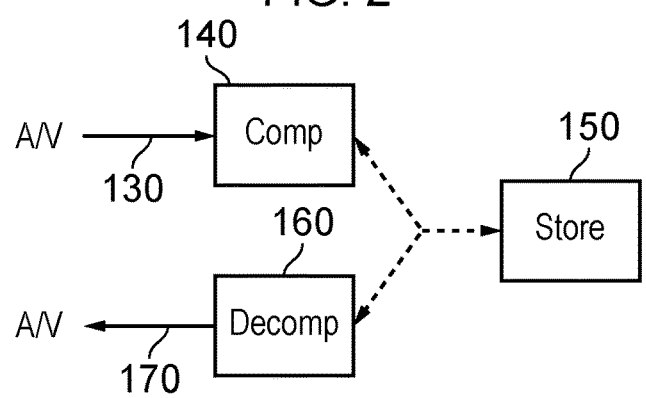
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
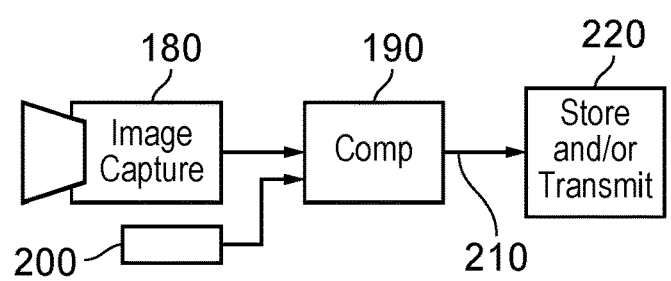
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

Figure 5:
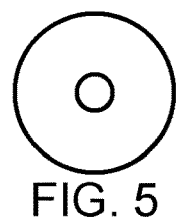
FIGS. 5 and 6 schematically illustrate storage media.
Figure 6:
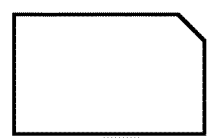

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
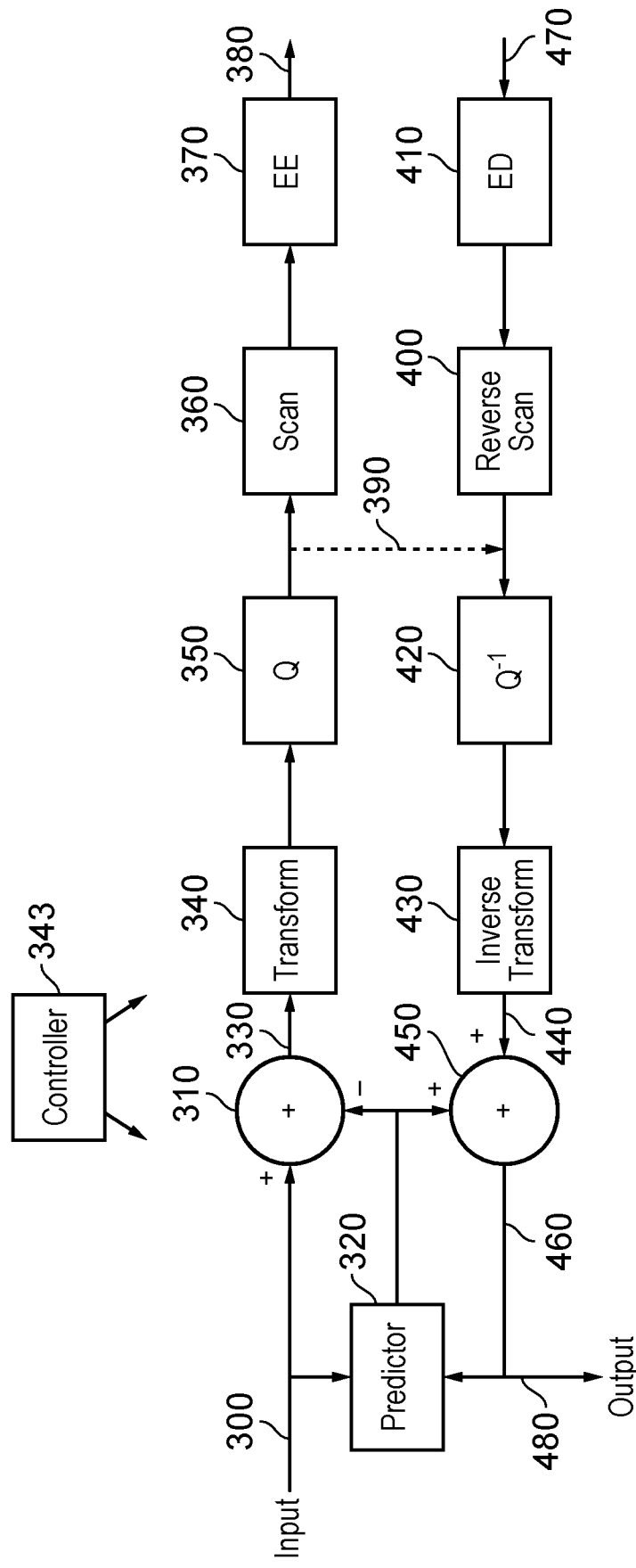
FIG. 7 provides a schematic overview of a video data compression and decompression apparatus.

FIG. 7 provides a schematic overview of a video data compression and decompression apparatus.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

The remainder of the apparatus acting as an encoder (to encode the residual or difference image) will now be described. The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder.

The output of the transform unit 340, which is to say, a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420. In instances where loss or potential loss is introduced by a stage, that stage may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480. In practice, further filtering may optionally be applied (for example, by a filter 560 shown in FIG. 8 but omitted from FIG. 7 for clarity of the higher level diagram of FIG. 7) before the signal is output.

Figure 8:
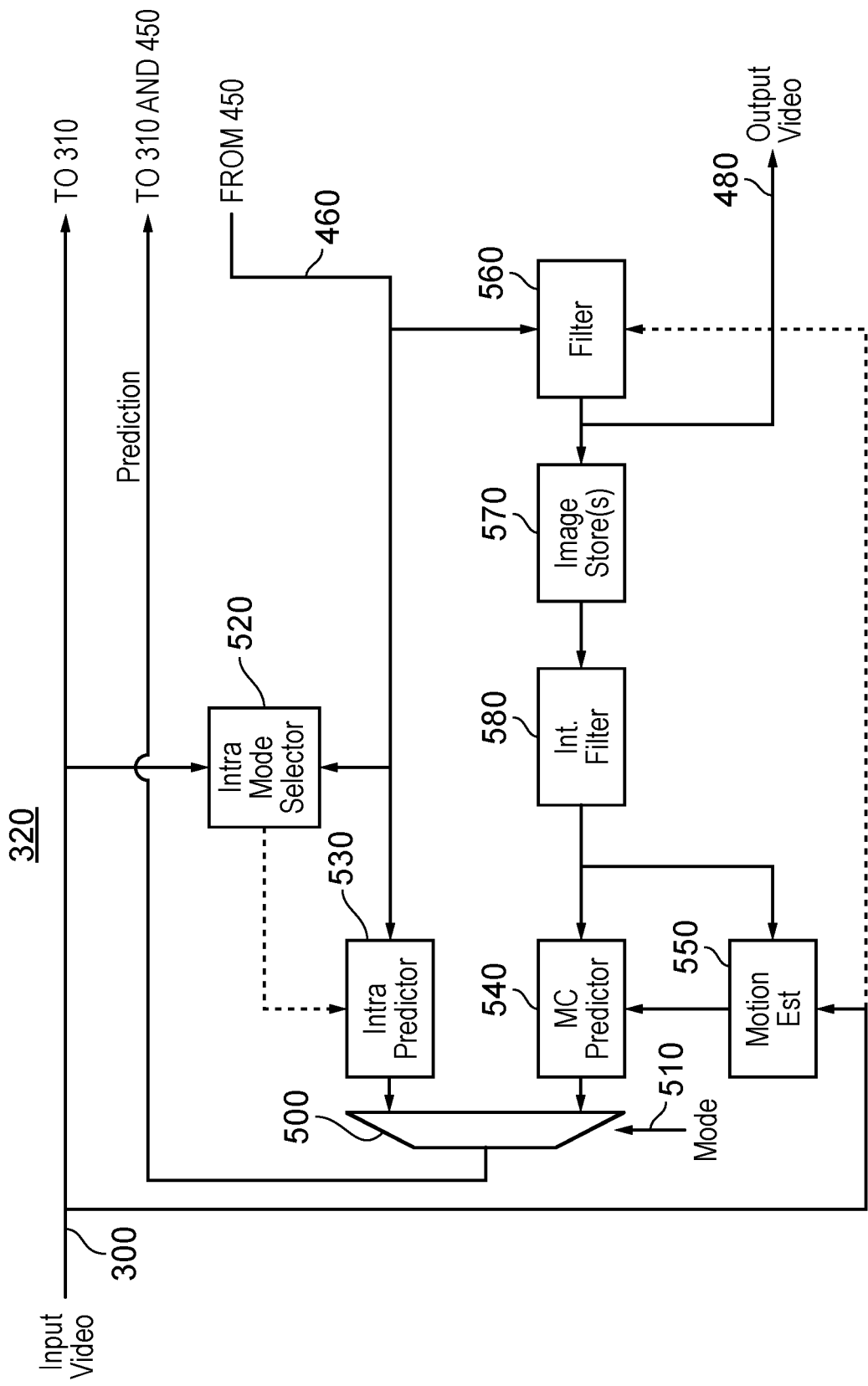
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output data-stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described. Firstly, the signal is optionally filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter may also be used. Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the filter unit 560 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in Bross et al: "High Efficiency Video Coding (HEVC) text specification draft 6", JCTVC-H1003_d0 (November 2011), the contents of which are incorporated herein by reference. In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

The intra-prediction process will now be discussed. In general terms, intra-prediction involves generating a prediction of a current block of samples from previously-encoded and decoded samples in the same image.

Figure 9:
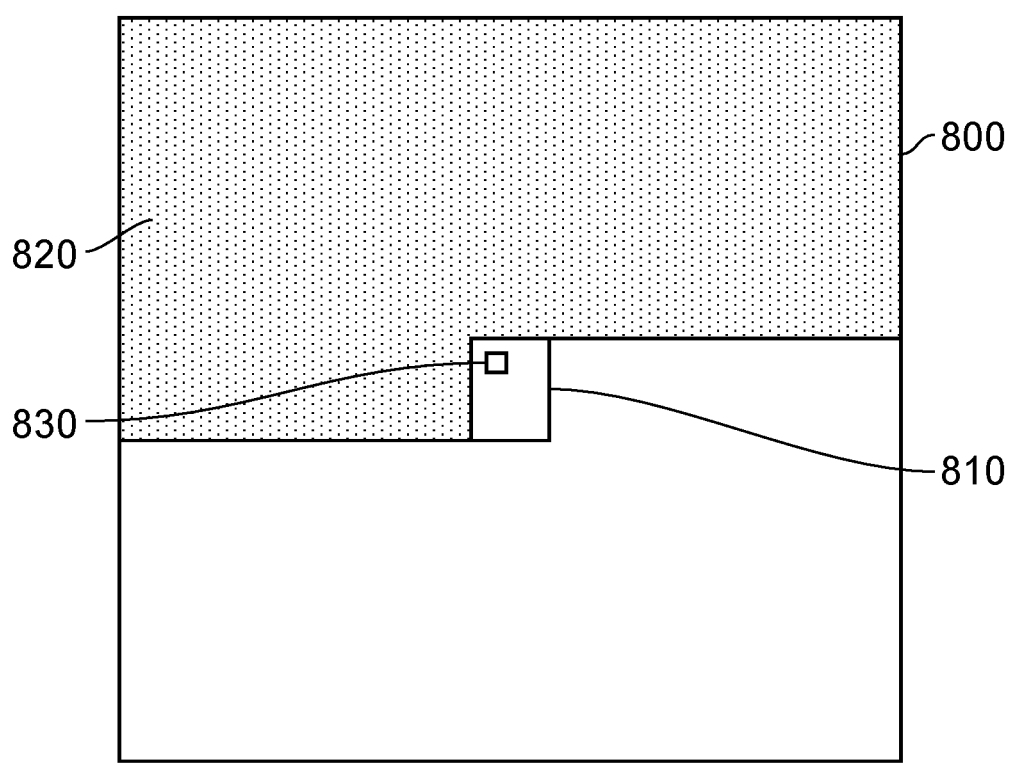
FIG. 9 schematically illustrates a partially-encoded image.

FIG. 9 schematically illustrates a partially encoded image 800. Here, the image is being encoded from top-left to bottom-right on a block by block basis. An example block encoded partway through the handling of the whole image is shown as a block 810. A shaded region 820 above and to the left of the block 810 has already been encoded. The intra-image prediction of the contents of the block 810 can make use of any of the shaded area 820 but cannot make use of the unshaded area below that.

In some examples, the image is encoded on a block by block basis such that larger blocks (referred to as coding units or CUs) are encoded in an order such as the order discussed with reference to FIG. 9. Within each CU, there is the potential (depending on the block splitting process that has taken place) for the CU to be handled as a set of two or more smaller blocks or transform units (TUs). This can give a hierarchical order of encoding so that the image is encoded on a CU by CU basis, and each CU is potentially encoded on a TU by TU basis. Note however that for an individual TU within the current coding tree unit (the largest node in the tree structure of block division), the hierarchical order of encoding (CU by CU then TU by TU) discussed above means that there may be previously encoded samples in the current CU and available to the coding of that TU which are, for example, above-right or below-left of that TU.

The block 810 represents a CU; as discussed above, for the purposes of intra-image prediction processing, this may be subdivided into a set of smaller units. An example of a current TU 830 is shown within the CU 810. More generally, the picture is split into regions or groups of samples to allow efficient coding of signalling information and transformed data. The signalling of the information may require a different tree structure of sub-divisions to that of the transform, and indeed that of the prediction information or the prediction itself. For this reason, the coding units may have a different tree structure to that of the transform blocks or regions, the prediction blocks or regions and the prediction information. In some examples such as HEVC the structure can be a so-called quad tree of coding units, whose leaf nodes contain one or more prediction units and one or more transform units; the transform units can contain multiple transform blocks corresponding to luma and chroma representations of the picture, and prediction could be considered to be applicable at the transform block level. In examples, the parameters applied to a particular group of samples can be considered to be predominantly defined at a block level, which is potentially not of the same granularity as the transform structure.

The intra-image prediction takes into account samples coded prior to the current TU being considered, such as those above and/or to the left of the current TU. Source samples, from which the required samples are predicted, may be located at different positions or directions relative to the current TU. To decide which direction is appropriate for a current prediction unit, the mode selector 520 of an example encoder may test all combinations of available TU structures for each candidate direction and select the prediction direction and TU structure with the best compression efficiency.

The picture may also be encoded on a "slice" basis. In one example, a slice is a horizontally adjacent group of CUs. But in more general terms, the entire residual image could form a slice, or a slice could be a single CU, or a slice could be a row of CUs, and so on. Slices can give some resilience to errors as they are encoded as independent units. The encoder and decoder states are completely reset at a slice boundary. For example, intra-prediction is not carried out across slice boundaries; slice boundaries are treated as image boundaries for this purpose.

Figure 10:
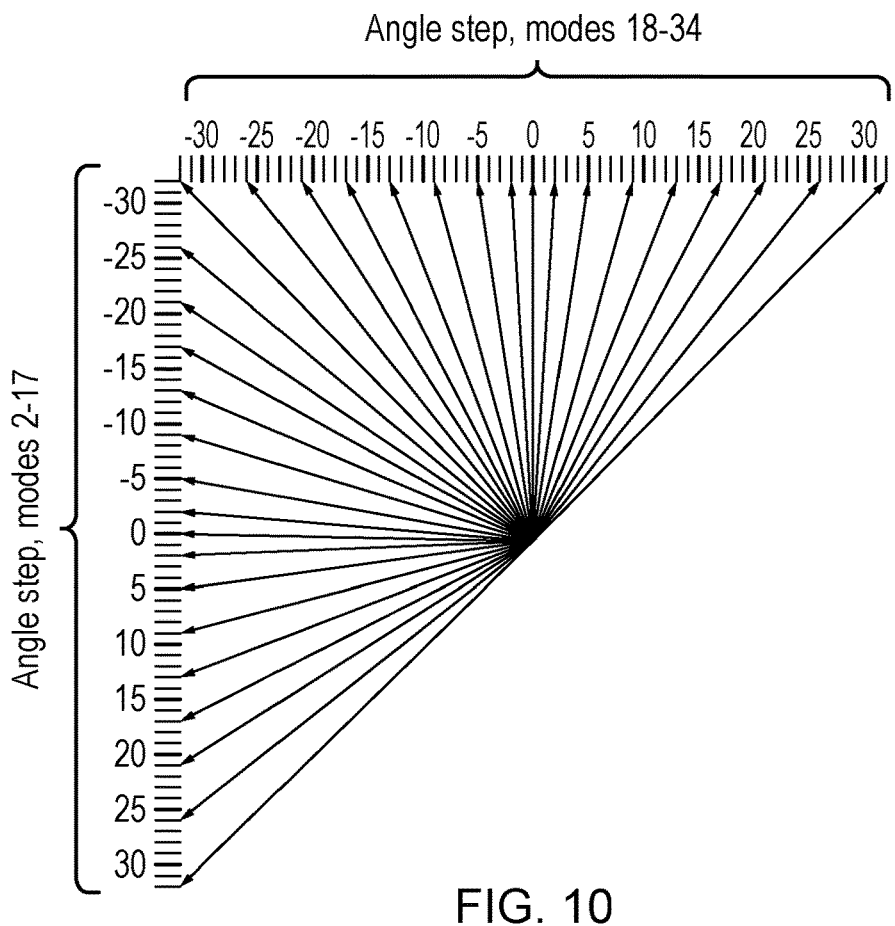
FIG. 10 schematically illustrates a set of possible intra-prediction directions.
Figure 11:
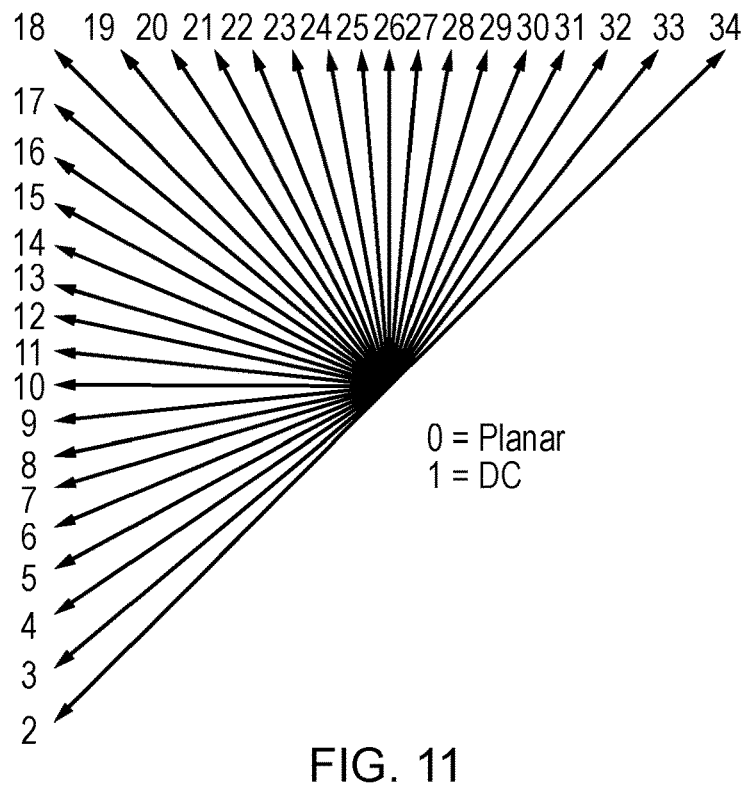
FIG. 11 schematically illustrates a set of prediction modes.

FIG. 10 schematically illustrates a set of possible (candidate) prediction directions. The full set of candidate directions is available to a prediction unit. The directions are determined by horizontal and vertical displacement relative to a current block position, but are encoded as prediction "modes", a set of which is shown in FIG. 11. Note that the so-called DC mode represents a simple arithmetic mean of the surrounding upper and left-hand samples. Note also that the set of directions shown in FIG. 10 is just one example; in other examples, a set of (for example) 65 angular modes plus DC and planar (a full set of 67 modes) as shown schematically in FIG. 12 makes up the full set. Other numbers of modes could be used.

In general terms, after detecting a prediction direction, the systems are operable to generate a predicted block of samples according to other samples defined by the prediction direction. In examples, the image encoder is configured to encode data identifying the prediction direction selected for each sample or region of the image (and the image decoder is configured to detect such data).

Figure 13:
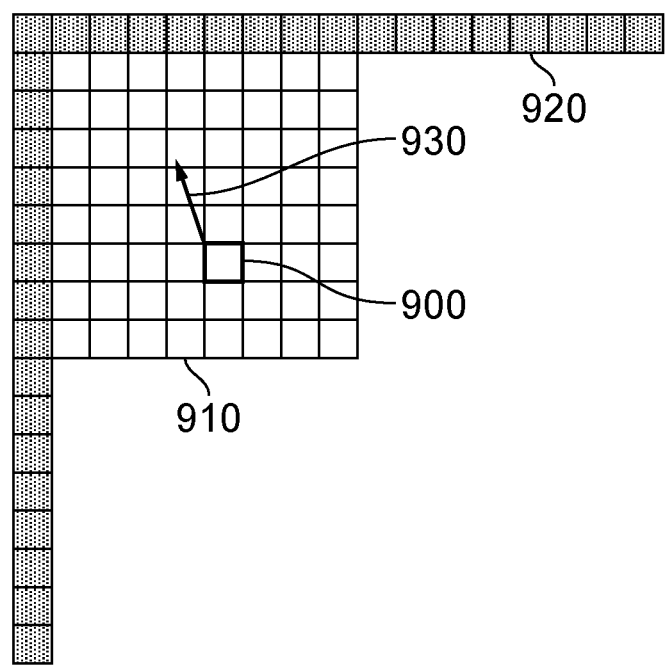
FIG. 13 schematically illustrates an intra-prediction process.

FIG. 13 schematically illustrates an intra-prediction process in which a sample 900 of a block or region 910 of samples is derived from other reference samples 920 of the same image according to a direction 930 defined by the intra-prediction mode associated with that sample. The reference samples 920 in this example come from blocks above and to the left of the block 910 in question and the predicted value of the sample 900 is obtained by tracking along the direction 930 to the reference samples 920. The direction 930 might point to a single individual reference sample but in a more general case an interpolated value between surrounding reference samples is used as the prediction value. Note that the block 910 could be square as shown in FIG. 13 or could be another shape such as rectangular.

Figures 14, 15:
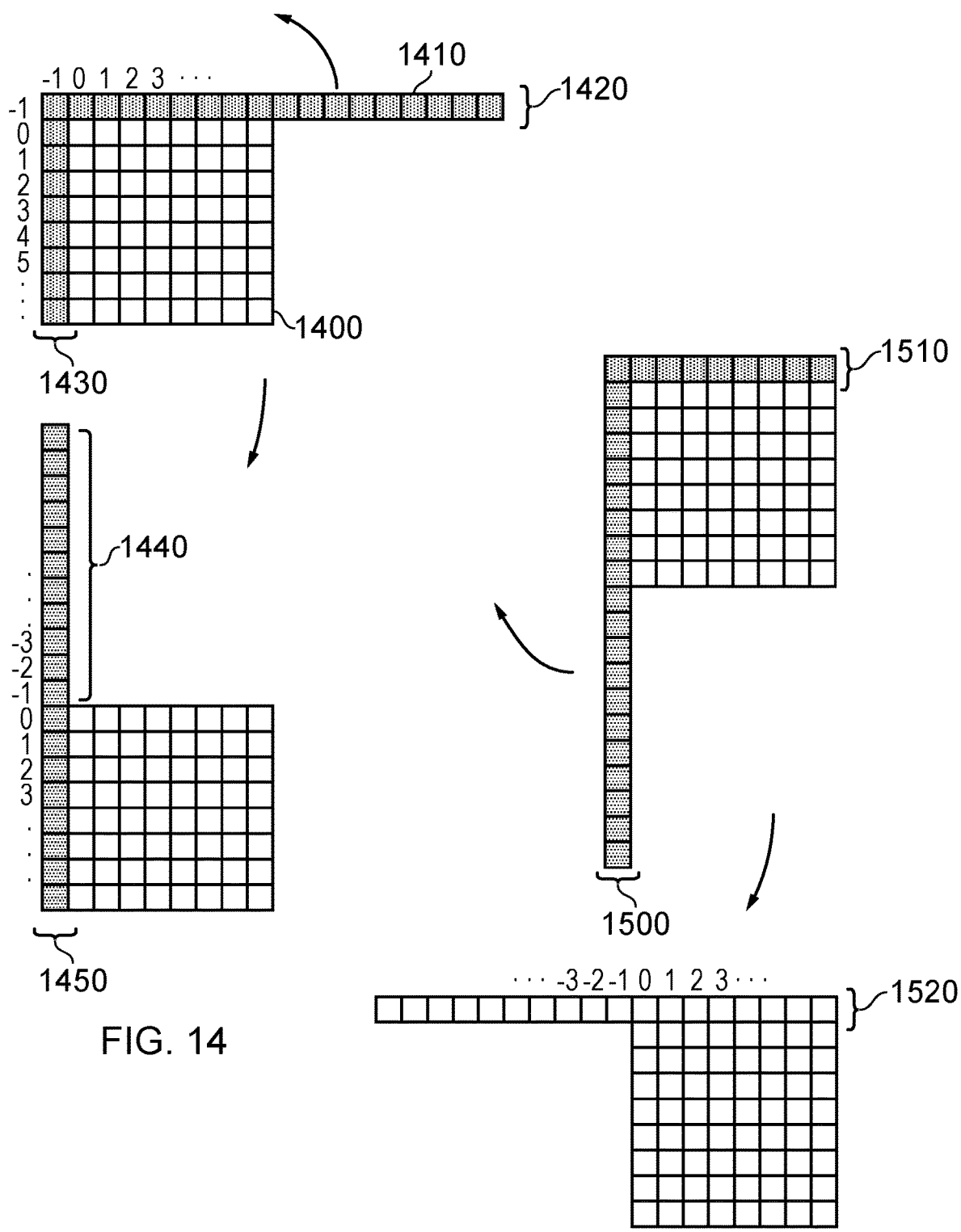
FIGS. 14 and 15 schematically illustrate a reference sample projection process.

FIGS. 14 and 15 schematically illustrate a previously proposed reference sample projection process.

In FIGS. 14 and 15, a block or region 1400 of samples to be predicted is surrounded by linear arrays of reference samples from which the intra prediction of the predicted samples takes place. The reference samples 1410 are shown as shaded blocks in FIGS. 14 and 15, and the samples to be predicted are shown as unshaded blocks. Note that an 8×8 block or region of samples to be predicted is used in this example, but the techniques are applicable to variable block sizes and indeed block shapes.

As mentioned, the reference samples comprise at least two linear arrays in respective orientations with respect to the current image region of samples to be predicted. For example, the linear arrays may be an array or row 1420 of samples above the block of samples to be predicted and an array or column 1430 of samples to the left of the block of samples to be predicted.

Figure 12:
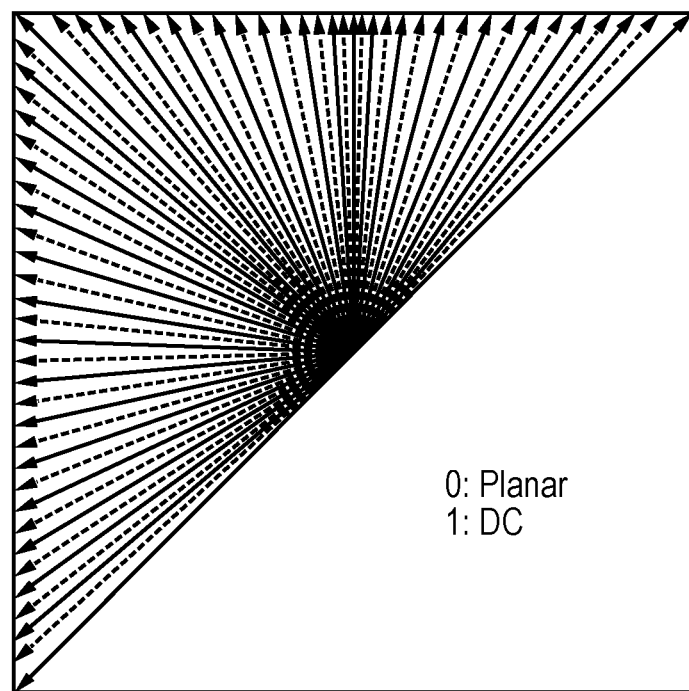
FIG. 12 schematically illustrates another set of prediction modes.

As discussed above with reference to FIG. 13, the reference sample arrays can extend beyond the extent of the block to be predicted, in order to provide for prediction modes or directions within the range indicated in FIGS. 10-12. Where necessary, if previously decoded samples are not available for use as reference samples at particular reference sample positions, other reference samples can be re-used at those missing positions. Reference sample filtering processes can be used on the reference samples.

A sample projection process is used to project at least some of the reference samples to different respective positions with respect to the current image region, in the manner shown in FIGS. 14 and 15. In other words, in embodiments, the projection process and circuitry operates to represent at least some of the reference samples at different spatial positions relative to the current image region, for example as shown in FIGS. 14 and 15. Thus at least some reference samples may be moved (for the purposes at least of defining an array of reference samples from which samples are predicted) with respect to their relative positions to the current image region. In particular, FIG. 14 relates to a projection process performed for modes which are generally to the left of the diagonal mode (18 in FIG. 11) mainly modes 2 . . . 17, and FIG. 15 schematically illustrates a reference sample projection carried for modes 19 . . . 34, namely those generally above the block to be predicted (to the right of the diagonal mode 18). The diagonal mode 18 can be assigned to either of these two groups as an arbitrary selection, such as to the group of modes to the right of the diagonal. So, in FIG. 14, when the current prediction mode is between modes 2 and 17 (or their equivalent in a system such as that of FIG. 12 having a different number of possible prediction modes), the sample array 1420 above the current block is projected to form additional reference samples 1440 in the left hand column. Prediction then takes place with respect to the linear projected array 1450 formed of the original left hand column 1430 and the projected samples 1440. In FIG. 15, for modes between 18 and 34 of FIG. 11 (or their equivalent in other sets of prediction modes such as those shown in FIG. 12), the reference samples 1500 in the left hand column are projected so as to extend to the left of the reference samples 1510 above the current block. This forms a projected array 1520.

One reason why projection of this nature is carried out is to reduce the complexity of the intra prediction process, in that all of the samples to be predicted are then referencing a single linear array of reference samples, rather than referencing two orthogonal linear arrays.

Figure 16:
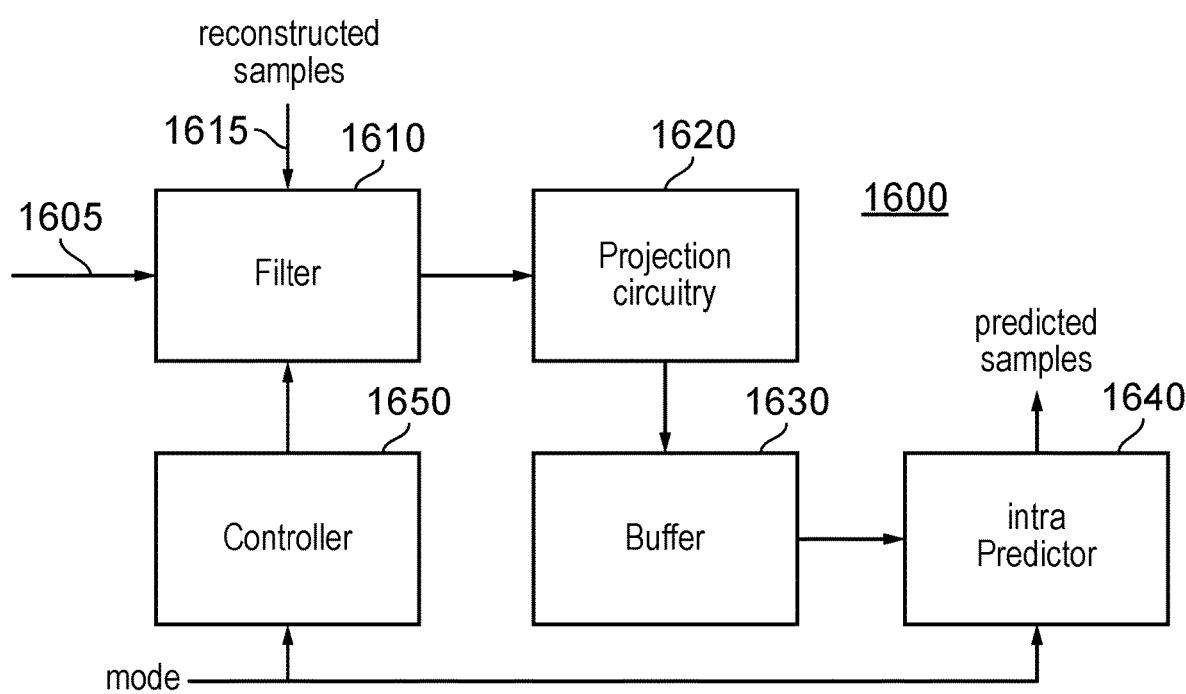
FIG. 16 schematically illustrates a predictor.

FIG. 16 schematically illustrates a previously proposed prediction circuitry 1600 arranged to carry out the projection process of FIGS. 14 and 15, specifically by providing projection circuitry 1620 configured to carry out a projection process on the reference samples applicable to a block or region to be predicted, which are in turn generated by a filter 1610 which (under the control of a controller 1650 during trial or final encoding and/or a filter control signal 1605 during decoding) applies a filtering process to be discussed below to reconstructed samples 1615, which is to say already encoded and decoded samples from the same image as the samples to be predicted. The projected reference samples are stored in a buffer 1630 to be accessed by an intra predictor 1630 to generate predicted samples from the projected reference samples. The projection process is carried out according to the prediction mode associated with the current block to be predicted, using the techniques discussed in connection with FIGS. 14 and 15.

In embodiments, the same projection process is carried out in the decoder and in the encoder, so that the predicted samples are the same in each instance.

Possible variations in operation between the use of prediction modes which will be referred to as "straight modes" and prediction modes which will be referred to as "curved modes" will now be discussed.

Figure 17:
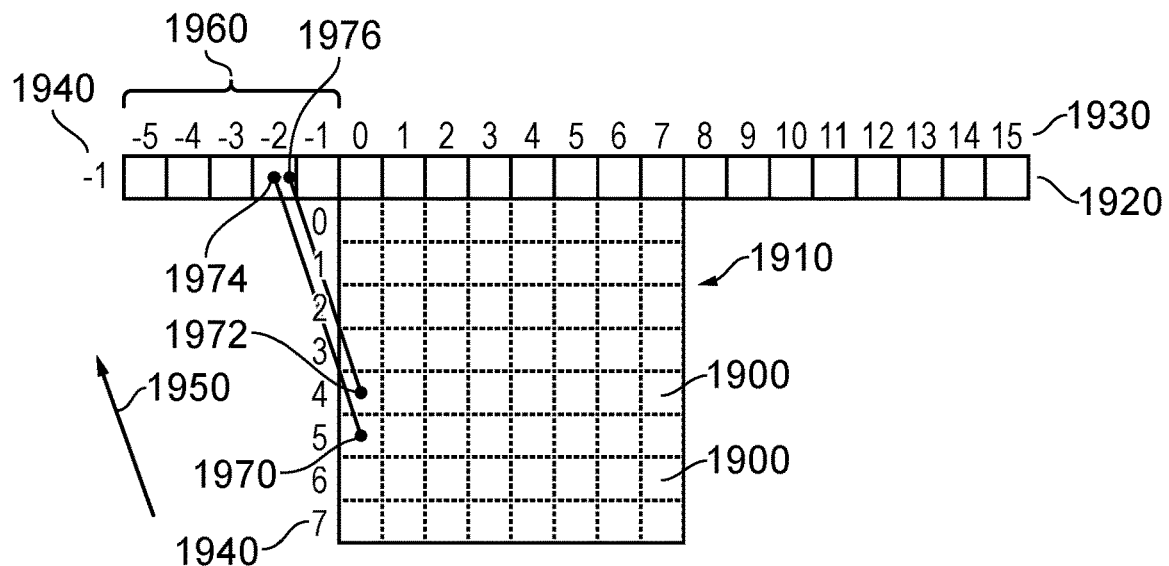
FIGS. 17 and 18 schematically illustrate the use of projected reference samples.
Figure 18:
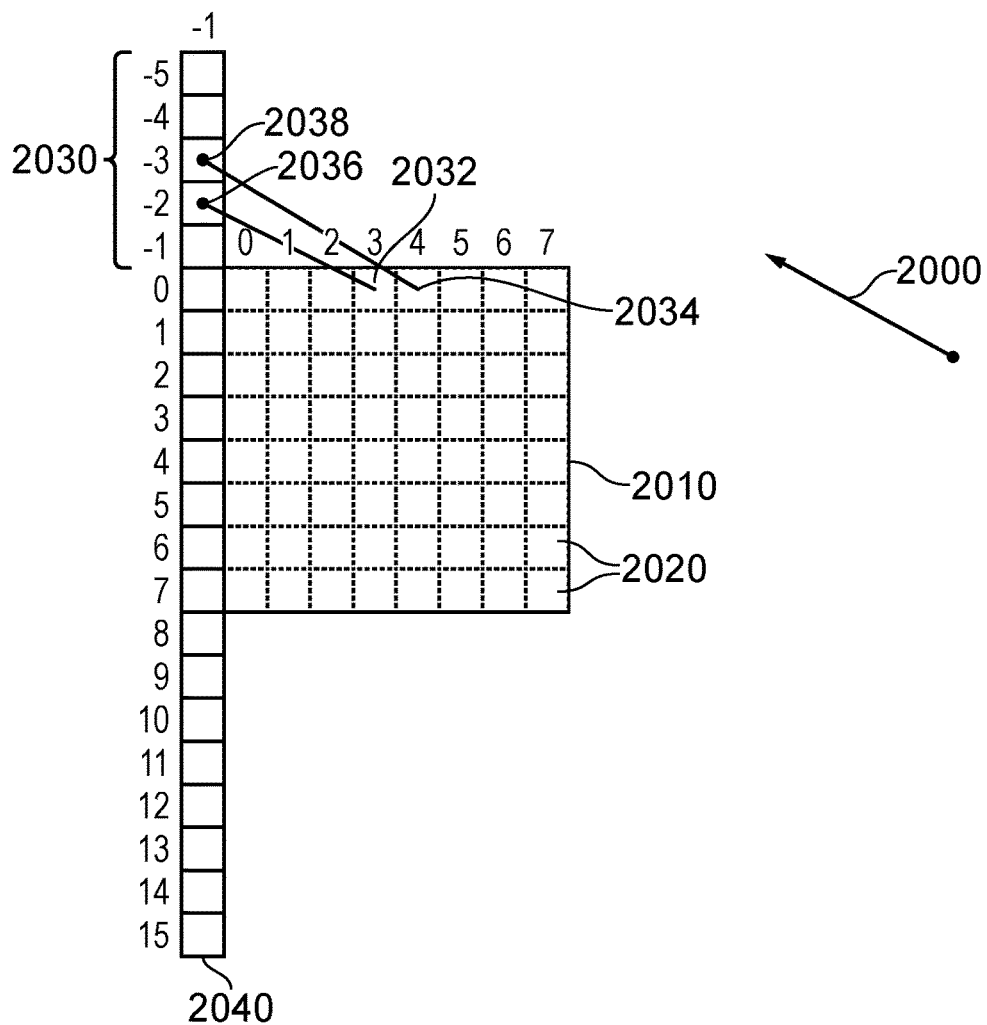

As further background, FIGS. 17 and 18 schematically illustrate an example technique by which samples 1900 of a current region 1910 or block to be predicted, are predicted from reference samples 1920. In this example, the reference samples have been projected into a linear array using the techniques described with reference to FIGS. 14-16 above.

A system of (x, y) coordinates is used for convenience, to allow individual reference or predicted sample positions to be identified. In the example of FIG. 17, x coordinates are shown by a row 1930 of numbers, and y coordinates are shown by a column 1940 of numbers. So, each reference or predicted sample position has an associated (x, y) designation using the coordinate system.

In the example of FIG. 17, a generally vertical mode (for example, a mode which is more vertical than horizontal) 1950, such as mode 23 in the designation of FIG. 11, noting that a different mode number could be used if the set of modes shown in FIG. 12 were employed, has been selected for prediction of samples 1900 of the block or region 1910. As discussed above with reference to FIGS. 14-16, such a generally vertical prediction mode is handled by the circuitry of FIG. 16 by projecting the left column of reference samples into an extension 1960 of the reference samples above the block or region 1910.

Each of the samples to be predicted 1900 is predicted as follows. For each sample to be predicted, there is an associated (x, y) location such as a location (0, 5) for a sample 1970 or a location (0, 4) for a sample 1972. These two samples are used purely by way of example and the same technique applies to each of the samples 1900 to be predicted.

The sample positions of the samples 1970, 1972 to be predicted are mapped according to the direction 1950 associated with the current prediction mode to respective locations or reference positions 1974, 1976 among the reference samples. This mapping may be carried out using an expression such as that shown below, noting that this is a linear expression with respect to the coordinate system (x, y):

For horizontal modes 2-17 in the notation of FIG. 11:

$$\text{predicted value}(x,y) = \{1-f(p)\} \times \text{ref}[y+i(p)] + f(p) \times \text{ref}[y+i(p)+1]$$

with $p = A \times (x+1)$

For vertical modes 18-34 in the notation of FIG. 11:

$$\text{predicted value}(x,y) = \{1-f(p)\} \times \text{ref}[x+i(p)] + f(p) \times \text{ref}[x+i(p)+1]$$

with $p = A \times (y+1)$ and where $i(p) = \text{floor}(p)$, is the value p rounded down (towards negative infinity) to the nearest integer, $f(p) = p - i(p)$ represents the fractional part of the value p.

A is an angle parameter indicating the angle of the current mode. To illustrate, for example, for a horizontal or vertical line, A would be 0; for a 45° diagonal line, A would be ±1.

The arrangement above refers to one example interpolation technique. Variations on this single interpolation technique will be discussed in more detail below.

Those skilled in the art would appreciate that integer approximations can be used to simplify the linear equations, for example, representing the angle parameter A as a fractional fixed-precision number. In HEVC, the angles have an accuracy of 5 fractional bits.

So, for example, each sample to be predicted is associated with a coordinate position within the current region; and the intra-image predictor is configured to detect the reference position for a given sample to be predicted as a function of the coordinate position of the given sample to be predicted, the function depending upon the selected prediction mode.

In example arrangements, the reference position 1974, 1976 is detected to an accuracy or resolution of less than one sample, which is to say with reference to the reference sample locations (−5, −1) ... (15, −1), a fractional value is used for the x coordinate of the reference position within the projected set of reference samples 1920. For example, the reference position could be detected to a resolution of ⅟₃₂ of a sample separation, so that the x coordinate of the reference positions 1974, 1976 is identified to that resolution. The y coordinate of the reference position is −1 in each case, but this is in fact irrelevant to the calculations that then take place, which relate to interpolation along the x axis of the reference samples 1920.

The prediction of the predicted values 1970, 1972 is an interpolation of the value applicable to the detected x coordinate of the reference sample position 1974, 1976, for example as described above in the formulae shown earlier.

A similar arrangement is shown schematically in FIG. 18, except that a generally horizontal prediction mode, for example a prediction mode which is more horizontal than vertical, such as (for example) mode 14 of the set shown in FIG. 11 (or a corresponding number for a similar mode in the set shown in FIG. 12) having a prediction direction 2000 is used. The selection of the particular prediction mode applies to the whole of the block or region 2010 of samples 2020 to be predicted and the particular example here is chosen purely for the purposes of the present explanation.

In the case of a generally horizontal mode, as discussed above, the projection circuitry shown in FIG. 16 projects those reference samples from above the block or region 2010 to form an extension 2030 of reference samples to the left of the region. Once again, the derivation of two example samples to be predicted, samples 2032, 2034, is shown, such that the sample position 2032, 2034 are mapped using the direction 2000 into reference positions 2036, 2038 amongst the set of reference samples 2040. Once again, a similar (x, y) coordinate system is used and the reference positions 2036, 2038 are expressed to a ⅟₃₂ sample resolution in the y-direction. The x coordinate of the reference sample positions is −1 but this is irrelevant to the process which follows. The sample values of the samples to be predicted are obtained in the manner described above.

In these arrangements, the intra predictor 530 provides an example of a detector configured to detect the reference position as an array position, with respect to an array of the reference samples, pointed to by the prediction direction applicable to the current sample to be predicted; and a filter configured to generate the predicted sample by interpolation of the array of reference samples at the detected array position. The detector may be configured to detect the array position to an accuracy of less than one sample such as ⅟₃₂ sample.

The intra mode selector 520 may be configured to perform at least a partial encoding to select the prediction mode.

Techniques for establishing which filter characteristic should be employed in connection with a particular intra-prediction operation will now be described with reference to FIGS. 19-24.

In the discussion which follows, at least two possible arrangements will be described. In a first example, at least two candidate prediction operations (for example, combinations of mode or direction and filter characteristics) represent the same relationship between a sample to be predicted and a corresponding group of reference samples (for example, the same prediction direction) but a different respective associated filtering operation of a set of candidate filtering operations. In other words, a particular directional mode could be tested and potentially used with one of two or more different reference sample filters being applied.

In another example arrangement, subsets of the directional modes are associated with different respective filtering characteristics for a reference sample filter, and in particular there is a pattern of associations between directional modes and respective filtering operations which pattern alternates with respect to an angular succession of the directional modes.

Figure 19:
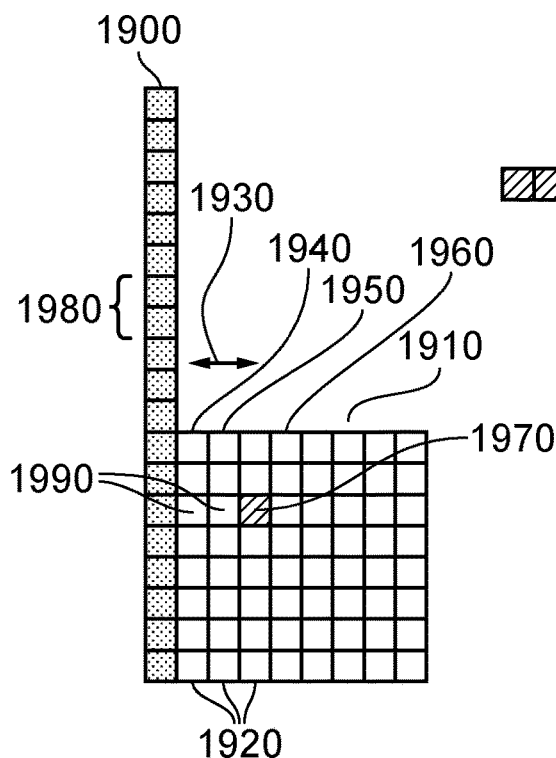
FIGS. 19 and 20 schematically illustrate interpolation processes.
Figure 20:
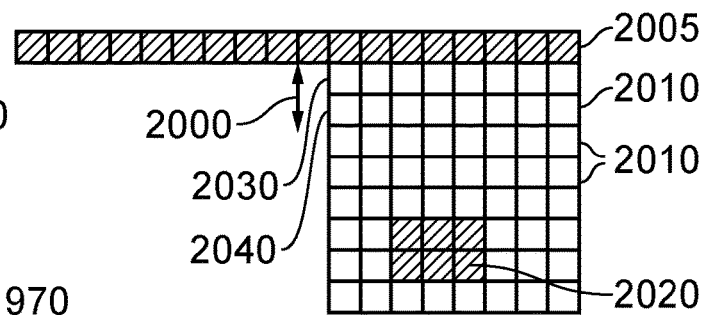

FIGS. 19 and 20 schematically demonstrate a technique to be described in more detail below, by which the intra-image predictor is configured to apply a different respective interpolation process for a plurality of subsets of predicted samples.

Looking at FIG. 19, the same notation is used as in FIG. 18 in which a set of reference samples 1900 is provided for the intra-image interpolation of predicted samples 1910. The predicted samples 1910 are generated by interpolation of the reference samples around a reference position within the reference samples pointed to, from the sample location of a particular sample to be predicted, by the current prediction mode. In the present examples, the interpolation technique itself can vary with location (of a current sample to be predicted) in the array of samples to be predicted, and/or in accordance with other parameters or features. For example, the array of samples to be predicted may be considered as columns 1920 of samples (as an example of respective subsets) so that, in the example arrangement of FIG. 19 where a prediction mode pointing generally upwards and leftwards, the interpolation technique used can vary from column to column, for example with increasing separation 1930 of the columns from the projected reference samples.

In FIG. 20, a corresponding separation 2000 can be used to vary row-by-row 2010, the interpolation technique used for each row of predicted samples.

It is not necessary to partition the samples to be predicted by rows or by columns; groups of multiple rows or columns could be used or other-shaped groups such as a group 2020 could be similarly be used. Or indeed, the interpolation technique could vary on a sample-by-sample basis. In general, there is a relationship (which can be the same relationship used at the encoder side and the decoder side) between a plurality of interpolation processes and a corresponding plurality of subsets of sample positions in the array of samples.

Embodiments of the present disclosure therefore provide (by operating the apparatus of FIG. 7 in accordance with any of the techniques discussed here) an example of an image encoding apparatus comprising:

a selector 520 configured to select, from a set of candidate prediction operations each defining at least a prediction direction, a prediction operation for prediction of samples of a current region of a current image, the current region comprising an array of two or more rows and two or more columns of samples; and an intra-image predictor 530, operating as discussed in the examples, configured to interpolate predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, in which the intra-image predictor is configured to apply an interpolation process to the group of reference samples in order to generate each predicted sample;

in which the intra-image predictor is configured to apply a different respective interpolation process for a plurality of subsets of the predicted samples, according to a relationship between a plurality of interpolation processes and a corresponding plurality of subsets of sample positions in the array of samples.

Similarly, at the decoder side there is provided an example of an image decoding apparatus comprising:

a prediction operation selector 520 configured to receive prediction operation data in an encoded data stream defining a prediction operation for a current region of a current image with respect to a group of reference samples, the current region comprising an array of two or more rows and two or more columns of samples; and an intra-image predictor 530, operating as discussed in the examples, configured to interpolate predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, in which the intra-image predictor is configured to apply an interpolation process to the group of reference samples in order to generate each predicted sample;

in which the intra-image predictor is configured to apply a different respective interpolation process for a plurality of subsets of the predicted samples, according to a relationship between a plurality of interpolation processes and a corresponding plurality of subsets of sample positions in the array of samples.

As shown in FIGS. 19 and 20, in example arrangements the subsets of predicted samples may comprise: predicted samples in a row of predicted samples, for substantially vertical prediction directions; and predicted samples in a column of predicted samples, for substantially horizontal prediction directions.

Figure 21:
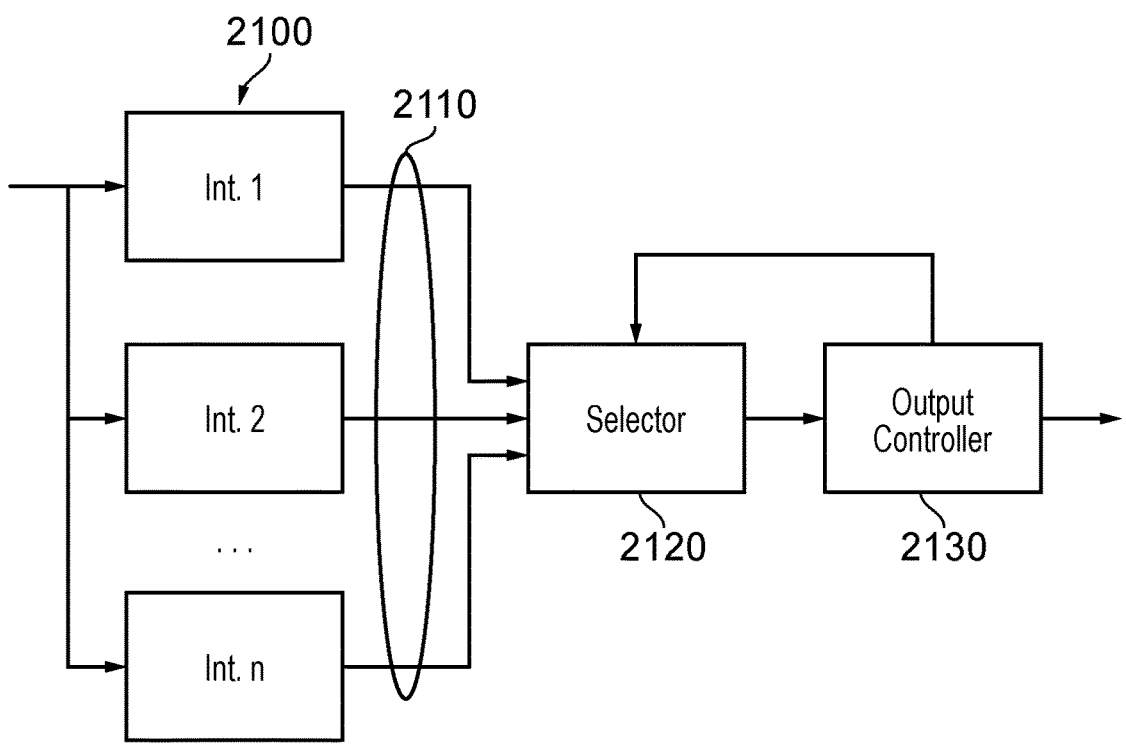

FIG. 21 schematically illustrates an arrangement to achieve this type of variable interpolation technique, in which an array of candidate interpolators 2100 (Int1 . . . IntN) are used within an intra-image predictor to generate multiple candidate predictions 2110 for a given predicted sample location. A selector 2120 acting under the control of an output controller 2130 selects the candidate interpolated predicted sample by a respective one of the interpolators for that predicted sample location in the array of predicted samples.

One of the interpolators (such as Int. 1) could be a two-sample interpolator of the type discussed above in connection with FIG. 17. Other interpolators of the set of candidate interpolators could be different interpolators, for example having different respective spatial frequency responses.

In other examples, successive subsets of predicted samples, for example subsets which are progressively further away in the direction 1930 or 2000 (FIGS. 19 and 20) from the respective reference samples, could be predicted not from the reference samples themselves in a direct sense but from, other, closer subsets of predicted samples which themselves are generated from the reference samples (or indeed from yet-closer subsets of reference samples). Here the term "closer" refers to a proximity to the reference samples, within the array of predicted samples.

For example, in FIG. 19, a column 1940 of predicted samples could be generated by interpolation according to the current angular mode from the reference samples 1900. However, for a column 1950, which is further away in the direction 1930 from the reference samples 1900, the column 1950 could be interpolated from predicted samples of the column 1940. This interpolation could be either on a directional basis (although in such cases it would then be necessary to provide for missing sample positions in the column 1950 for modes other than a simple horizontal mode) or as a direct interpolation in a horizontal direction from a corresponding predicted location in the column to the left as drawn. Similarly, the column 1960 could be interpolated, for example on a horizontal basis, from corresponding samples in either the column 1940 or the column 1950 or a combination of the both. In general terms, predicted samples of each column of the array 1910, other than the column 1940 closest to the reference samples, may be interpolated, at least in part, from other predicted samples which themselves are closer to the column 1900 of reference samples.

In other examples, a predicted sample, in for example, the column 1950, could be interpolated in part from reference samples 1900 at a location pointed to by the current directional mode and in part from samples in the column 1940 of predicted samples at a corresponding vertical location in the array 1910. An example of this is shown in FIG. 19, in which an example predicted sample 1970 may be predicted by mixing, for example according to a mixing ratio dependent upon the distance 1930 for the sample 1970, of an interpolation from reference samples 1980 at a location in the set of reference samples pointed to by a current prediction mode and predicted sample values at one or both of locations 1990 which are horizontally aligned with the predicted sample location 1970.

As before, the subsets of predicted samples do not have to be whole columns in the arrangement of FIG. 19 but could be other groupings of predicted samples.

A similar arrangement can apply to the rows of samples in FIG. 20, with for example predicted samples in a row 2040 being predicted, at least in part, from predicted sample values in a row 2030 closer to the reference samples 2005.

Figure 22:
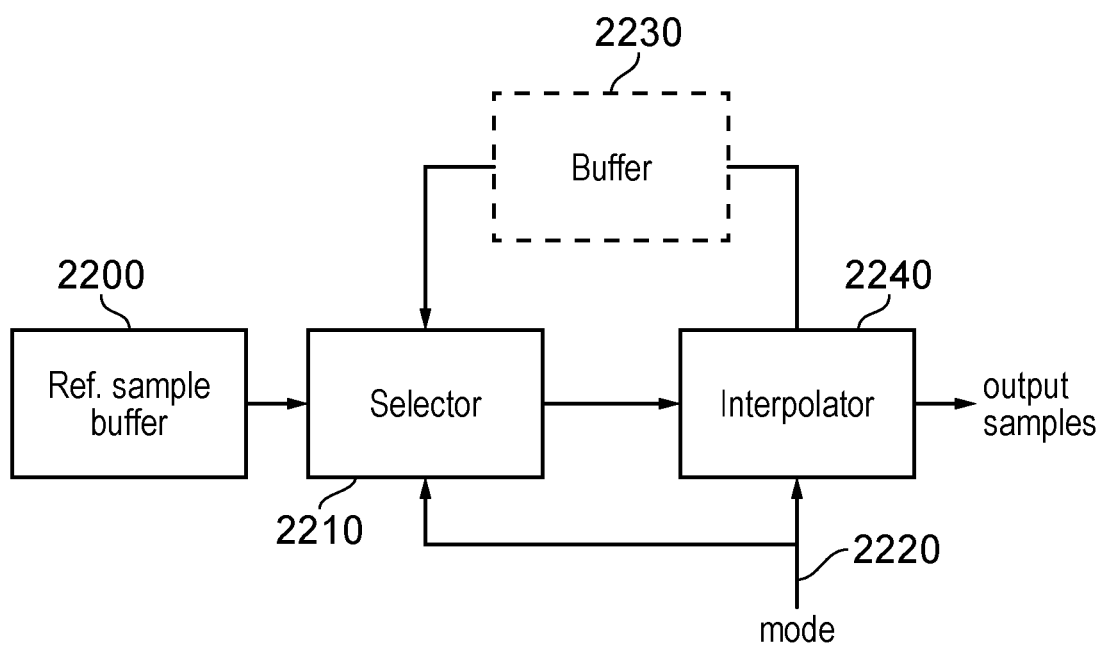

FIG. 22 schematically represents an example arrangement to achieve this technique, in which reference samples 1900, 2005 are stored in a reference sample buffer 2200. For the interpolation of the current predicted sample value, a selector 2210 selects appropriate reference samples at a location in the set of reference samples pointed to by a current prediction mode 2220. Optionally, the selector 2210 can also select buffered interpolated (predicted) samples held in a buffer 2230, for example previously predicted sample values such as predicated sample values closer to the reference samples. An interpolator 2240 interpolates the current output sample from either or both of the reference samples and the buffered previously predicted samples.

Therefore, FIG. 22 provides an example in which for at least one or more given predicted samples, the interpolation process used by the intra-image predictor comprises interpolating a subset of samples from another subset of the predicted samples.

Figure 23:
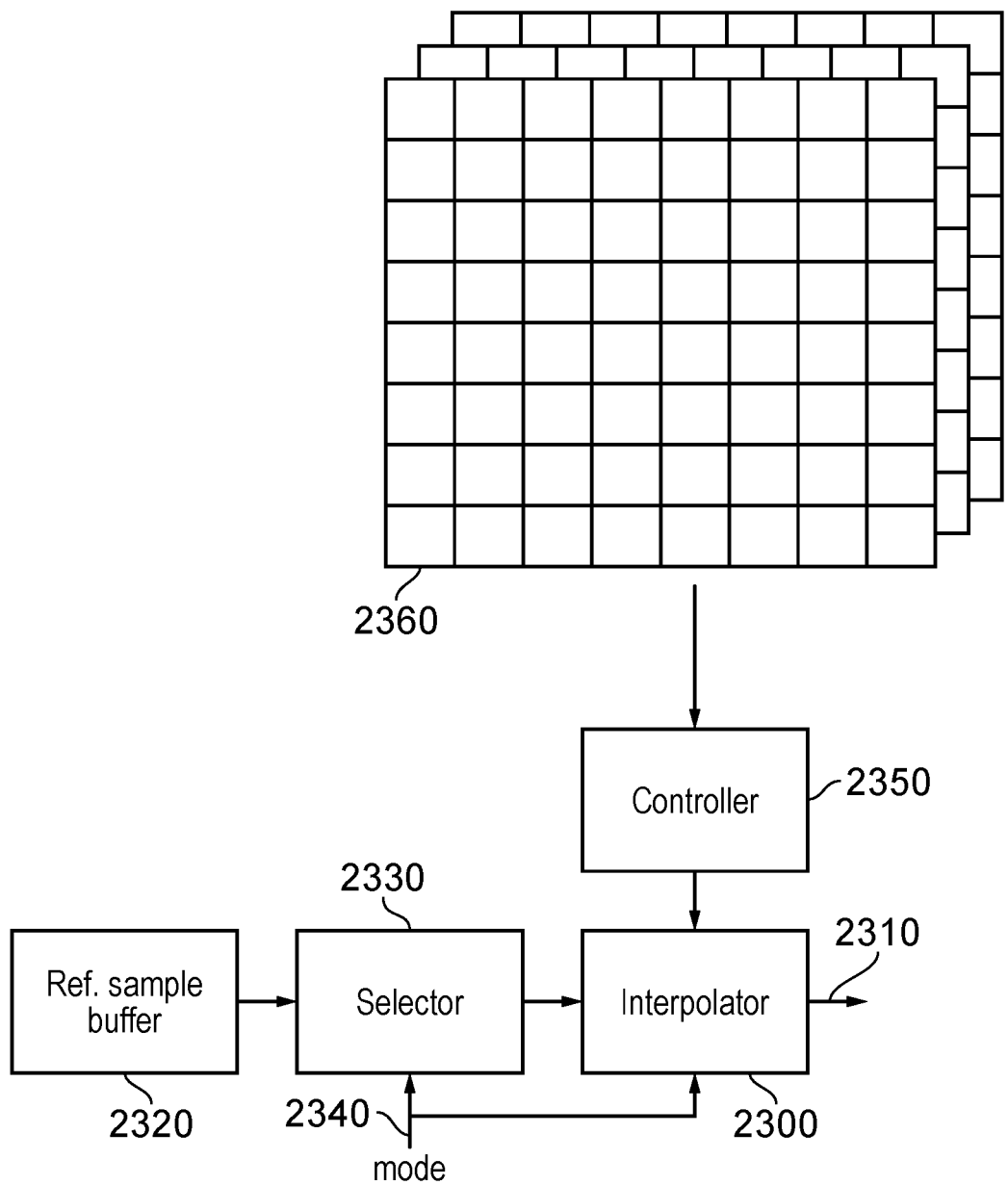

Referring to FIG. 23, the techniques to be described here and applicable either to the arrangement of FIG. 21 or to the arrangement of FIG. 22, and it is noted that the lack in FIG. 23 of a buffer 2230 for previously interpolated samples is merely for clarity of the diagram and that with such a buffer the arrangement of FIG. 23 could operate in accordance with any of the techniques (interpolating predicted samples, at least in part, from previously predicted samples such as predicted samples closer to the reference samples) as discussed above.

An interpolator 2300 interpolates output predicted samples 2310 in accordance with reference samples from a reference sample buffer 2320 selected by a selector 2330 according to a current directional mode 2340. Different interpolation profiles can be used, for example having different respective spatial frequency responses, under the control of a controller 2350 responsive to one or more arrays 2360 or control data. For example, there could be one data item in an array 2360 of control data for each predicted sample position within the array of predicted samples, or (again as an example) there could be one control value per column or one control column per row or one control value per group of n×n predicted samples (where n is an integer from 2 upwards) or the like. There could be multiple sets of arrays 2360 of control data, for example, according to the array size of the array of predicted samples to be generated, different prediction modes, luminance/chrominance samples to be predicted or the like. The control data could be provided in parameter sets such as sequence parameters sets or picture parameter sets or could be predetermined at the encoder and decoder.

In general terms, the encoder and decoder perform corresponding operations, which is to say that whatever interpolation technique is used to add the encoder, it should also be used at the decoder. In the examples discussed above, there is a defined or predetermined relationship (or one established, or selected from a shortlist of such relationships, by parameter set data such as data in the picture or sequence parameter set) between interpolation profile or technique and location within an array of predicted samples, which as mentioned may be predetermined or may be established parameter set data such as that shown in FIG. 23. In such examples, the intra-image predictor (at the decoder or encoder) is configured to select an interpolation process to interpolate a predicted sample at a given subset of sample positions in response to a location of the given subset of sample positions within the array of samples. For example, the intra-image predictor may be configured to select an interpolation process to interpolate a predicted sample at a given subset of (on e or more) sample positions in response to a separation 1930, 2000 between the given subset of sample positions and the corresponding group of reference samples. As shown in FIGS. 19 and 20, in examples the intra-image predictor may be responsive to an array of two or more rows and two or more columns of control values, so as to provide a respective control value defining an interpolation process for each sample position.

In other examples, the choice of interpolator could be a factor which is tested during trial encoding (for example, using the apparatus as discussed here but in a trial encoding mode under the control of the controller 343) so that for any particular predicted sample location, an interpolator profile is chosen during trial encoding. The interpolator profile could be encoded for the output data stream so that the decoder knows which interpolator profile to use. The encoding could be with respects to a default choice (so that a flag is needed to indicate a deviation from the default choice), with data being encoded to the output data stream for each subset of predicted samples for which such a choice is made. So, in an example, a flag could be associated with a row or column of predicted samples in the arrangements of FIGS. 19 and 20 to indicate that either a default interpolator has been used or that another interpolator has been used (in which case, if there is more than one possibility then further flag data would be needed to indicate the chosen interpolator). Having said this, a feature of the pre-assigned interpolator profiles, for example represented by the arrangement of FIG. 23, is that the output data stream does not need to be expanded by the use of such flags.

Figure 24A:
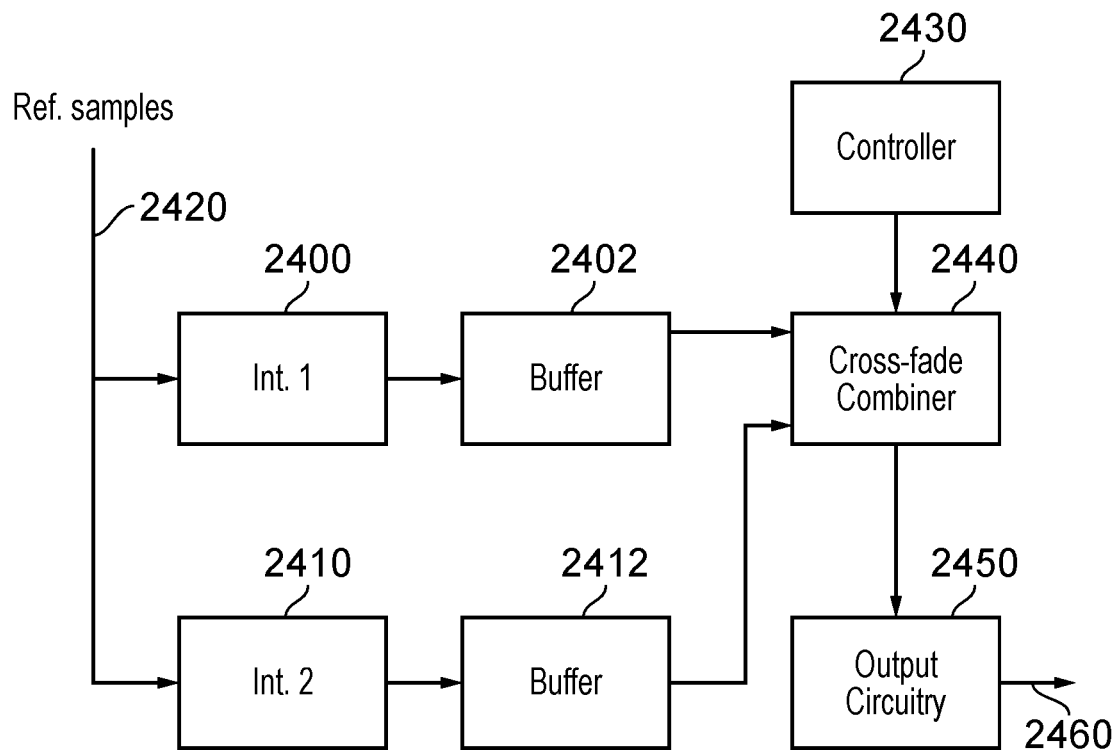

Referring to FIG. 24a, another technique for varying the interpolation profile or response used within an array of predicted samples is to provide two or more interpolators (only two are shown in FIG. 24a for clarity of the drawing) 2400, 2410 having different respective spatial frequency profiles or responses. For a selected group of reference samples 2420 pointed to by the current angular prediction mode, interpolation is preformed using each of the interpolators 2400, 2410 and the resulting intermediate predicted sample value is buffered in a respective buffer 2402, 2412. Under the control of a controller 2430 a cross-fade combiner generates a weighted combination of the two (or more) buffered interpolated values, for example as:

$$\text{combined value} = (m * \text{int\_value\_one}) + ((1-m) * \text{int\_value\_two})$$

Here, int_value_one and int_value_two are the respective buffered values at the buffers 2402, 2412; m is a parameter which may be determined in a trail encoding and communicated to the decoder, or may be predicted-sample-location specific, or may be specific to a group or subset of two or more samples locations in the array of predicted samples, and/or may be dependent upon one or more of the sample array size, sample array shape, prediction mode, type of data (luminance, chrominance), sub-sampling format (4:4:4, 4:2:2, 4:2:0 or the like), bit depth and the like.

Output circuitry 2450 outputs the combined value as a predicted sample value 2460 for that predicted samples location in the array of predicted samples.

FIG. 24a therefore provides an example in which the intra-image predictor comprises two or more interpolators having different respective spatial frequency responses, and a combiner configured to generate a given predicted sample by combining interpolated sample values generated by the two or more interpolators according to a combination ratio associated with the location of the given predicted sample within the array of samples.

Figure 24B:
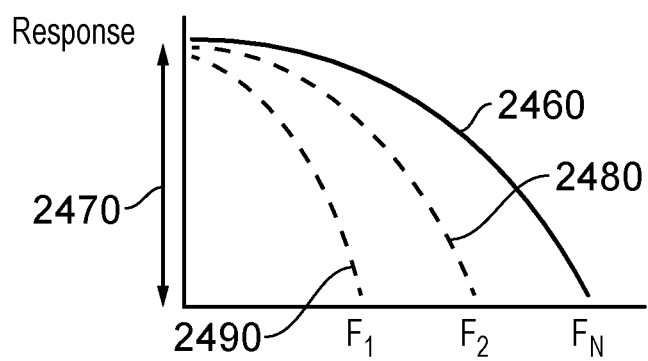
FIG. 24b schematically illustrates frequency responses.

As discussed above, the plurality of interpolation processes comprises filtering processes having different respective spatial frequency responses. By way of example, FIG. 24b schematically represents various filter responses, on a vertical axis of response (such as gain in decibels (dB)) against a horizontal axis of frequency (for example, frequency on a log scale up to a Nyquist frequency FN).

In examples of the present disclosure, generally "softer" filters are used for interpolation of predicted samples which are generally further-away from the reference samples. For example, the intra-image predictor may be configured to select an interpolation process to interpolate predicted samples at a given subset of sample positions, the interpolation process being defined by a low pass filter having a low pass spatial frequency bandwidth which generally decreases in width with increasing separation between the given subset of sample positions and the corresponding group of reference samples. Here, the term "softer" refers to softness or sharpness of the outcome, that is to say the interpolated samples. So a low pass filter which cuts off more high frequency content will be considered softer (in this context) than one which cuts off less high frequency content. In the example of FIG. 24b, a first filter response 2460 has a cut-off (an arbitrary definition of a frequency at which the filter response is a certain margin 2570 such as 6 dB below its peak) of FN, the Nyquist frequency. A filter response 2480 is softer in this context, and a filter response 2490 is softer still. The softer filters have a smaller bandwidth. The filters may be, for example, low pass filters.

At a technical level, the further away a predicted sample is from the reference samples, the less certainty there is about its relationship to the reference samples, so a softer filter can be more appropriate. Because of the reduced dependency upon the precise prediction direction that this brings, it can be possible in such arrangements to operate with a reduced number of candidate prediction modes, compared to the number used in a system with uniform interpolation processes applied regardless of distance from the reference samples. This can in turn lead to simplification of the trial selection and the actual encoding of the prediction modes.

Figure 25:
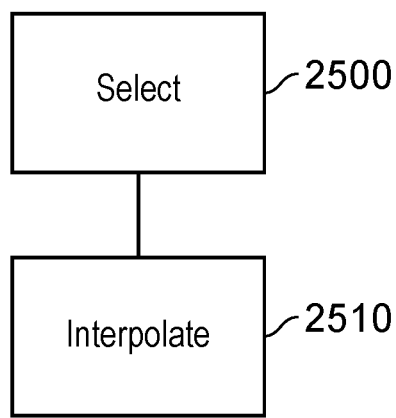
FIGS. 25-26 are schematic flowcharts illustrating respective methods.

FIG. 25 is a schematic flowchart illustrating an image encoding method comprising:

selecting (at a step 2500), from a set of candidate prediction operations each defining at least a prediction direction, a prediction operation for prediction of samples of a current region of a current image, the current region comprising an array of two or more rows and two or more columns of samples; and interpolating (at a step 2510) predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, by applying an interpolation process to the group of reference samples in order to generate each predicted sample;

in which interpolating step comprises applying a different respective interpolation process for a plurality of subsets of the predicted samples, according to a predetermined relationship between a plurality of interpolation processes and a corresponding plurality of subsets of sample positions in the array of samples.

Figure 26:
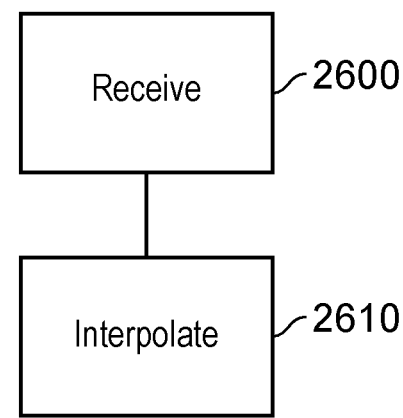

FIG. 26 is a schematic flowchart illustrating an image decoding method comprising:

receiving (at a step 2600) prediction operation data in an encoded data stream defining a prediction operation for a current region of a current image with respect to a group of reference samples, the current region comprising an array of two or more rows and two or more columns of samples; and interpolating (at a step 2610) predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, by applying an interpolation process to the group of reference samples in order to generate each predicted sample;

in which interpolating step comprises applying a different respective interpolation process for a plurality of subsets of the predicted samples, according to a predetermined relationship between a plurality of interpolation processes and a corresponding plurality of subsets of sample positions in the array of samples.

In each case, embodiments of the disclosure are represented by computer software which, when executed by a computer, causes the computer to carry out the respective method and by a machine-readable non-transitory storage medium which stores such computer software. In the case of encoding methods, embodiments of the disclosure are represented by a data signal comprising coded data generated according to the respective method.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Respective aspects and features are defined by the following numbered clauses:

1. An image encoding apparatus comprising:

a selector configured to select, from a set of candidate prediction operations each defining at least a prediction direction, a prediction operation for prediction of samples of a current region of a current image, the current region comprising an array of two or more rows and two or more columns of samples; and an intra-image predictor configured to interpolate predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, in which the intra-image predictor is configured to apply an interpolation process to the group of reference samples in order to generate each predicted sample;

in which the intra-image predictor is configured to apply a different respective interpolation process for a plurality of subsets of the predicted samples, according to a relationship between a plurality of interpolation processes and a corresponding plurality of subsets of sample positions in the array of samples.

2. The image encoding apparatus of clause 1, in which the plurality of interpolation processes comprises filtering processes having different respective spatial frequency responses 3. The image encoding apparatus of clause 1 or clause 2, in which the intra-image predictor is configured to select an interpolation process to interpolate a predicted sample at a given subset of sample positions in response to a location of the given subset of sample positions within the array of samples.

4. The image encoding apparatus of any one of clauses 1 to 3, in which the intra-image predictor is configured to select an interpolation process to interpolate a predicted sample at a given subset of sample positions in response to a separation between the given subset of sample positions and the corresponding group of reference samples.

5. The image encoding apparatus of any one of the preceding clauses, in which the intra-image predictor is configured to select an interpolation process to interpolate predicted samples at a given subset of sample positions, the interpolation process being defined by a low pass filter having a low pass spatial frequency bandwidth which generally decreases in width with increasing separation between the given subset of sample positions and the corresponding group of reference samples.

6. The image encoding apparatus of clause 3, in which the intra-image predictor is responsive to an array of two or more rows and two or more columns of control values, so as to provide a respective control value defining an interpolation process for each sample position.

7. The image encoding apparatus of clause 3, in which the intra-image predictor comprises two or more interpolators having different respective spatial frequency responses, and a combiner configured to generate a given predicted sample by combining interpolated sample values generated by the two or more interpolators according to a combination ratio associated with the location of the given predicted sample within the array of samples.

8. The image encoding apparatus of any one of clauses 1 to 7, in which, for at least one or more given predicted samples, the interpolation process used by the intra-image predictor comprises interpolating a subset of samples from another subset of the predicted samples.

9. The image encoding apparatus of clause 8, in which the subsets of predicted samples comprise:
   predicted samples in a row of predicted samples, for substantially vertical prediction directions; and
   predicted samples in a column of predicted samples, for substantially horizontal prediction directions.

10. Video storage, capture, transmission or reception apparatus comprising apparatus according to any one of the preceding clauses.

11. An image decoding apparatus comprising:
   a prediction operation selector configured to receive prediction operation data in an encoded data stream defining a prediction operation for a current region of a current image with respect to a group of reference samples, the current region comprising an array of two or more rows and two or more columns of samples; and
   an intra-image predictor configured to interpolate predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, in which the intra-image predictor is configured to apply an interpolation process to the group of reference samples in order to generate each predicted sample;
   in which the intra-image predictor is configured to apply a different respective interpolation process for a plurality of subsets of the predicted samples, according to a relationship between a plurality of interpolation processes and a corresponding plurality of subsets of sample positions in the array of samples.

12. The image decoding apparatus of clause 11, in which the plurality of interpolation processes comprise filtering processes having different respective spatial frequency responses.

13. The image decoding apparatus of clause 11 or clause 12, in which the intra-image predictor is configured to select an interpolation process to interpolate a predicted sample at a given subset of sample positions in response to a location of the given subset of sample positions within the array of samples.

14. The image decoding apparatus of any one of clauses 11 to 13, in which the intra-image predictor is configured to select an interpolation process to interpolate a predicted sample at a given subset of sample positions in response to a separation between the given subset of sample positions and the corresponding group of reference samples.

15. The image decoding apparatus of any one of clauses 11 to 14, in which the intra-image predictor is configured to select an interpolation process to interpolate predicted samples at a given subset of sample positions, the interpolation process being defined by a low pass filter having a low pass spatial frequency bandwidth which generally decreases in width with increasing separation between the given subset of sample positions and the corresponding group of reference samples.

16. The image decoding apparatus of clause 13, in which the intra-image predictor is responsive to an array of two or more rows and two or more columns of control values, so as to provide a respective control value defining an interpolation process for each sample position.

17. The image decoding apparatus of clause 13, in which the intra-image predictor comprises two or more interpolators having different respective spatial frequency responses, and a combiner configured to generate a given predicted sample by combining interpolated sample values generated by the two or more interpolators according to a combination ratio associated with the location of the given predicted sample within the array of samples.

18. The image encoding apparatus of any one of clauses 11 to 17, in which, for at least one or more given predicted samples, the interpolation process used by the intra-image predictor comprises interpolating a subset of samples from another subset of the predicted samples.

19. The image decoding apparatus of clause 18, in which the groups of predicted samples comprise:
   predicted samples in a row of predicted samples, for substantially vertical prediction directions; and
   predicted samples in a column of predicted samples, for substantially horizontal prediction directions.

20. Video storage, capture, transmission or reception apparatus comprising apparatus according to any one of clauses 11 to 19.

21. An image encoding method comprising:
   selecting, from a set of candidate prediction operations each defining at least a prediction direction, a prediction operation for prediction of samples of a current region of a current image, the current region comprising an array of two or more rows and two or more columns of samples; and
   interpolating predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, by applying an interpolation process to the group of reference samples in order to generate each predicted sample;
   in which interpolating step comprises applying a different respective interpolation process for a plurality of subsets of the predicted samples, according to a relationship between a plurality of interpolation processes and a corresponding plurality of subsets of sample positions in the array of samples.

22. Computer software which, when executed by a computer, causes the computer to carry out the method of clause 21.

23. A machine-readable non-transitory storage medium which stores the computer software of clause 22.

24. A data signal comprising coded data generated according to the method of clause 21.

25. An image decoding method comprising:
receiving prediction operation data in an encoded data stream defining a prediction operation for a current region of a current image with respect to a group of reference samples, the current region comprising an array of two or more rows and two or more columns of samples; and
interpolating predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, by applying an interpolation process to the group of reference samples in order to generate each predicted sample;
in which interpolating step comprises applying a different respective interpolation process for a plurality of subsets of the predicted samples, according to a relationship between a plurality of interpolation processes and a corresponding plurality of subsets of sample positions in the array of samples.

26. Computer software which, when executed by a computer, causes the computer to carry out the method of clause 25.

27. A machine-readable non-transitory storage medium which stores the computer software of clause 26.

The invention claimed is:

1. An image encoding apparatus, comprising:
control circuitry configured to select, from a set of candidate prediction operations each defining at least a prediction direction, a prediction operation for prediction of samples of a current region of a current image, the current region comprising an array of two or more rows and two or more columns of samples; and
processing circuitry configured to interpolate predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, wherein the processing circuitry is configured to apply an interpolation process to the group of reference samples in order to generate each predicted sample,
wherein the processing circuitry is further configured to apply a different respective interpolation process for each subset of a plurality of subsets of the predicted samples, according to a relationship between a plurality of interpolation processes and a corresponding plurality of subsets of sample positions in the array of samples, and
wherein the processing circuitry is further configured to select an interpolation process to interpolate a particular predicted sample at a particular subset of sample positions in response to a separation between the particular subset of sample positions and a particular group of reference samples corresponding to the particular predicted sample.

2. The image encoding apparatus of claim 1, wherein the plurality of interpolation processes comprises filtering processes having different respective spatial frequency responses.

3. The image encoding apparatus of claim 1, wherein the processing circuitry is further configured to select the interpolation process to interpolate the particular predicted sample at the particular subset of sample positions in response to a location of the particular subset of sample positions within the array of samples.

4. The image encoding apparatus of claim 1, wherein the processing circuitry is further configured to select the interpolation process to interpolate predicted samples at a particular subset of sample positions, the interpolation process being defined by a low-pass filter having a low-pass spatial frequency bandwidth which decreases in width with increasing separation between the particular subset of sample positions and the particular group of reference samples.

5. The image encoding apparatus of claim 1, wherein, for at least one or more given predicted samples, the interpolation process used by the processing circuitry comprises interpolating a subset of samples from another subset of the predicted samples.

6. A video storage, capture, transmission, or reception apparatus, comprising the apparatus according to claim 1.

7. An image decoding apparatus, comprising:
control circuitry configured to receive prediction operation data in an encoded data stream defining a prediction operation for a current region of a current image with respect to a group of reference samples, the current region comprising an array of two or more rows and two or more columns of samples; and
processing circuitry configured to interpolate predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, wherein the processing circuitry is configured to apply an interpolation process to the group of reference samples in order to generate each predicted sample,
wherein the processing circuitry is further configured to apply a different respective interpolation process for each subset of a plurality of subsets of the predicted samples, according to a relationship between a plurality of interpolation processes and a corresponding plurality of subsets of sample positions in the array of samples,
wherein the processing circuitry is responsive to an array of two or more rows and two or more columns of control values, so as to provide a respective control value defining an interpolation process for each sample position.

8. The image decoding apparatus of claim 7, wherein the plurality of interpolation processes comprise filtering processes having different respective spatial frequency responses.

9. The image decoding apparatus of claim 7, wherein the processing circuitry is further configured to select an interpolation process to interpolate a particular predicted sample at a particular subset of sample positions based on a location of the particular subset of sample positions within the array of samples.

10. The image decoding apparatus of claim 7, wherein the processing circuitry is further configured to select the interpolation process to interpolate a particular predicted sample at a particular subset of sample positions in response to a separation between the particular subset of sample positions and a particular group of reference samples corresponding to the particular sample.

11. The image decoding apparatus of claim 7, wherein the processing circuitry is further configured to select the interpolation process to interpolate predicted samples at a particular subset of sample positions, the interpolation process being defined by a low-pass filter having a low-pass spatial frequency bandwidth which decreases in width with increasing separation between the particular subset of sample positions and the particular group of reference samples.

12. The image decoding apparatus of claim 9, wherein the processing circuitry comprises two or more interpolator circuits having different respective spatial frequency responses, and a combining circuit configured to generate the particular predicted sample by combining interpolated sample values generated by the two or more interpolator circuits according to a combination ratio associated with the location of the particular predicted sample within the array of samples.

13. The image encoding apparatus of claim 7, wherein, for at least one or more given predicted samples, the interpolation process used by the processing circuitry comprises interpolating a subset of samples from another subset of the predicted samples.

14. A video storage, capture, transmission, or reception apparatus, comprising the apparatus according to claim 7.

15. An image encoding method, comprising:
selecting, from a set of candidate prediction operations each defining at least a prediction direction, a prediction operation for prediction of samples of a current region of a current image, the current region comprising an array of two or more rows and two or more columns of samples; and
interpolating predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, by applying an interpolation process to the group of reference samples in order to generate each predicted sample;
wherein the interpolating step comprises applying a different respective interpolation process for each subset of a plurality of subsets of the predicted samples, according to a relationship between a plurality of interpolation processes and a corresponding plurality of subsets of sample positions in the array of samples, and
wherein the processing circuitry is further configured to select an interpolation process to interpolate a particular predicted sample at a particular subset of sample positions in response to a separation between the particular subset of sample positions and a particular croup of reference samples corresponding to the particular predicted sample.

16. A non-transitory machine-readable storage medium including computer program instructions, which when executed by a computer, causes the computer to perform the method of claim 15.

17. An image decoding method, comprising:
receiving prediction operation data in an encoded data stream defining a prediction operation for a current region of a current image with respect to a group of reference samples, the current region comprising an array of two or more rows and two or more columns of samples; and
interpolating predicted samples of the current region with respect to one or more of a group of reference samples being samples decoded from previously encoded samples of the current image, the group of reference samples being selected in dependence upon a prediction direction, defined by the selected prediction operation, between a current sample to be predicted and a reference position amongst the reference samples, by applying an interpolation process to the group of reference samples in order to generate each predicted sample,
wherein the interpolating step comprises applying a different respective interpolation process for a plurality of subsets of the predicted samples, according to a relationship between a plurality of interpolation processes and a corresponding plurality of subsets of sample positions in the array of samples, and
wherein the processing circuitry is responsive to an array of two or more rows and two or more columns of control values, so as to provide a respective control value defining an interpolation process for a sample position.

18. A non-transitory machine-readable storage medium including computer program instructions, which when executed by a computer, causes the computer to perform the method of claim 17.

* * * * *